United States Patent Office 3,293,315
Patented Dec. 20, 1966

3,293,315
ALKYLATION PROCESS AND CATALYST THEREFOR
William G. Nixon, Westchester, Ill., assignor to Universal Oil Products Company, Des Plaines, Ill., a corporation of Delaware
No Drawing. Filed Jan. 24, 1964, Ser. No. 339,895
16 Claims. (Cl. 260—671)

This invention relates to a process for the conversion of organic aromatic compounds and more particularly relates to a process for converting alkylatable aromatic compounds into more useful compounds. More specifically, this invention is concerned with a process for the alkylation of an alkylatable aromatic compound with an olefin-acting compound utilizing a novel catalytic composition of matter.

An object of this invention is to produce alkylated aromatic hydrocarbons, and more particularly, to produce monoalkylated benzene hydrocarbons. A specific object of this invention is a process for the production of ethylbenzene, a desired chemical intermediate, which ethylbenzene is utilized in large quantities in dehydrogenation processes for the manufacture of styrene, one of the starting materials for the production of resins and some synthetic rubber. Another specific object of this invention is to produce alkylated aromatic hydrocarbons boiling within the gasoline boiling range having high anti-knock value and which may be used as such or as a component of gasoline suitable for use in automobile and airplane engines. A further specific object of this invention is a process for the production of cumene by the reaction of benzene with propylene in the presence of a novel catalytic composition of matter, which cumene product is oxidized in large quantities to form cumene hydroperoxide which is readily decomposed into phenol and acetone. Another object of this invention is to provide a process for the introduction of alkyl groups into aromatic hydrocarbons of high vapor pressure at normal conditions with minimum loss of said high vapor pressure aromatic hydrocarbons and maximum utilization thereof in the process utilizing a novel catalytic composition of matter.

One embodiment of this invention resides in a process for the alkylation of an alkylatable aromatic compound with an olefin-acting compound at alkylation conditions in the presence of a substantially anhydrous catalyst prepared by combining a phosphoric acid-containing composite with an oxide of sulfur to effect chemical combination of the phosphoric acid portion of said composite with said oxide of sulfur.

A further embodiment of this invention resides in a process for the alkylation of an alkylatable aromatic compound with an olefin-acting compound at alkylation conditions in the presence of a substantially anhydrous catalyst prepared by combining a phosphoric acid-containing composite with an oxide of sulfur selected from the group consisting of sulfuric acid, sulfurous acid, ammonium oxides of sulfur and metallic oxides of sulfur to effect chemical combination of the phosphoric acid portion of said composite with said oxide of sulfur.

A still further embodiment of this invention is found in a process for the alkylation of an alkylatable aromatic compound with an olefin-acting compound at alkylation conditions including a temperature in the range of from about 0° to about 300° C. and a pressure in the range of from about atmospheric to about 200 atmospheres in the presence of a substantially anhydrous catalyst prepared by combining a phosphoric acid-containing composite with an oxide of sulfur selected from the group consisting of sulfuric acid, sulfurous acid, ammonium oxides of sulfur and metallic oxides of sulfur to effect chemical combination of the phosphoric acid portion of said composite with said oxide of sulfur.

A specific embodiment of the invention resides in a process for the alkylation of benzene with propylene at alkylation conditions including a temperature in the range of from about 0° to about 300° C. and a pressure in the range of from about atmospheric to about 200 atmospheres in the presence of a substantially anhydrous catalyst prepared by combining a phosphoric acid-containing composite with an oxide of sulfur selected from the group consisting of sulfuric acid, sulfurous acid, ammonium oxides of sulfur and metallic oxides of sulfur to effect chemical combination of the phosphoric acid portion of said composite with said oxide of sulfur.

A more specific embodiment of the invention resides in a process for the alkylation of benzene with a refinery off-gas at alkylation conditions including a temperature in the range of from about 0° to about 300° C. and a pressure in the range of from about atmospheric to about 200 atmospheres in the presence of a substantially anhydrous catalyst prepared by combining a phosphoric acid-containing composite with an oxide of sulfur derived from ammonium sulfate to effect chemical combination of the phosphoric acid portion of said composite with said oxide of sulfur.

Other objects and embodiments referring to alternative unsaturated organic compounds and to alternative catalytic compositions of matter will be found in the following further detailed description of the invention.

It has now been discovered that aromatic compounds and particularly alkylatable aromatic compounds may be converted to other and more useful compounds by contacting said alkylatable aromatic compound with an olefin-acting compound in the presence of certain catalytic compositions of matter which are prepared by specific methods. Examples of alkylatable aromatic compounds which may be converted according to the process of this invention include benzene, toluene, ortho-xylene, meta-xylene, para-xylene, ethylbenzene, ortho-ethyltoluene, meta-ethyltoluene, para-ethyltoluene, 1,2,3-trimethylbenzene, 1,2,4-trimethylbenzene, 1,3,5-trimethylbenzene, diethylbenzenes, triethylbenzenes, normal propylbenzene, isopropylbenzene, etc. Preferred alkylatable aromatic compounds are monocyclic aromatic hydrocarbons, that is, benzene hydrocarbons. Higher molecular weight alkyl aromatic hydrocarbons are also suitable. These include those aromatic hydrocarbons such as are produced by the alkylation of aromatic hydrocarbons with olefin polymers and are used as intermediates in the preparation of sulfonate surface-active agents. Such products are frequently referred to in the art as detergent alkylate, and include hexylbenzenes, nonylbenzenes, dodecylbenzenes, pentadecylbenzenes, hexyltoluenes, nonyltoluenes, dodecyltoluenes, pentadecyltoluenes, etc. Very often alkylate is obtained as a high boiling fraction in which the alkyl group attached to the aromatic nucleus varies in size from about $C_9$ to $C_{18}$. Other suitable aromatic hydrocarbons, which at specified alkylation conditions, depending upon the melting point of the aromatic chosen, would be in liquid form, would include those aromatic hydrocarbons with two or more aryl groups such as diphenyl, diphenylmethane, triphenyl, triphenylmethane, fluorene, stilbene, etc. Examples of other aromatic hydrocarbons utilizable within the scope of this invention which at specified alkylation conditions, depending upon melting point of the aromatic chosen, would be in liquid form, include those containing condensed aromatic rings. These include naphthalene, alkyl naphthalenes, anthracene, phenanthrene, naphthacene, rubrene, etc. Of the above-mentioned aromatic hydrocarbons that could be utilized in the process of this invention, the benzene hydrocarbons are preferred, and of the preferred benzene hydrocarbons, benzene itself is particularly preferred.

The olefin-acting compound, acting as the alkylating agent, may be selected from diverse materials including monoolefins, diolefins, polyolefins, actylenic hydrocarbons, and also alcohols, ethers, and esters, the latter including alkyl halides, alkyl sulfates, alkyl phosphates, and various esters of carboxylic acids. The preferred olefin-acting compounds are olefinic hydrocarbons which comprise monoolefins containing one double bond per molecule and polyolefins which contain more than one double bond per molecule. Monoolefins which are utilized as olefin-acting compounds in the process of the present invention are either normally gaseous or normally liquid and include ethylene, propylene, 1-butene, 2-butene, isobutylene, and higher molecular weight normally liquid olefins such as the various pentenes, hexenes, heptenes, octenes, and mixtures thereof, and still higher molecular weight liquid olefins, the latter including various olefin polymers having from about 9 to 18 carbon atoms per molecule including propylene trimer, propylene tetramer, propylene pentamer, etc. Cycloolefins such as cyclopentene, methylcyclopentene, cyclohexene, methylcylohexene, etc. may also be utilized. Also included within the scope of the olefin-acting compound are certain substances capable of producing olefinic hydrocarbons or intermediates thereof under the conditions of operation utilized in the process. Typical olefin-producing substances or olefin-acting compounds capable of use include alkyl halides capable of undergoing dehydrohalogenation to form olefinic hydrocarbons and thus containing at least two carbon atoms per molecule. Examples of such alkyl halides include ethyl fluoride, n-propyl fluoride, isopropyl fluoride, n-butyl fluoride, isobutyl fluoride, sec-butyl fluoride, tert-butyl fluoride, etc., ethyl chloride, n-propyl chloride, isopropyl chloride, n-butyl chloride, isobutyl chloride, sec-butyl chloride, tert-butyl chloride, etc., ethyl bromide, n-propyl bromide, isopropyl bromide, n-butyl bromide, isobutyl bromide, sec-butyl bromide, tert-butyl bromide, etc. As stated hereinabove, other esters such as alkyl sulfates including ethyl sulfate, propyl sulfate, etc., and alkyl phosphates including ethyl phosphates, etc. may also be utilized. Ethers such as diethyl ether, ethyl propyl ether, dipropyl ether, etc. are also included within the generally broad scope of the term olefin-acting compound and may be successfully utilized as alkylating agents in the process of this invention.

In addition, the process of this invention may be successfully applied to and utilized for complete conversion of olefin hydrocarbons when these olefin hydrocarbons are present in minor quantities in various gas streams. Thus, the normally gaseous olefin for use in the process of this invention need not be concentrated. Such normally gaseous olefin hydrocarbons appear in minor quantities in various refinery gas streams, usually diluted with gases such as hydrogen, nitrogen, methane, ethane, propane, etc. These gas streams containing minor quantities of olefin hydrocarbons are obtained in petroleum refineries from various refinery installations including thermal cracking units, catalytic cracking units, thermal reforming units, coking units, polymerization units, dehydrogenation units, etc. Such refinery gas streams have in the past often been burned for fuel value, since an economical process for the utilization of their olefin hydrocarbon content has not been available. This is particularly true for refinery gas streams known as off-gas streams containing relatively minor quantities of olefin hydrocarbons such as ethylene, propylene, etc.

As hereinbefore set forth, the invention is concerned with a process for the alkylation of alkylatable aromatic compounds, said process being effected in the presence of a catalyst which possesses a high degree of hydrocarbon conversion activity and is particularly effective as an alkylation catalyst for alkylatable aromatic compounds, a representative number of which are hereinabove set forth. The catalyst comprises a phosphoric acid-containing composite that is combined with an oxide of sulfur to effect chemical combination of the phosphoric acid portion of said composite with said oxide of sulfur. The composite, if desired, may comprise a high surface area solid support although it is one of the features of the catalyst of the present invention that low surface area supports such as alpha-alumina are satisfactory for the preparation of catalysts for use in the process of this invention as contrasted to hydrocarbon conversion catalysts prepared by chemically combining only an oxide of sulfur with alpha-alumina, said alpha-alumina in the latter case being an unsatisfactory support for the oxide of sulfur alone.

As set forth hereinabove, the support may comprise a high surface area support. By the term high surface area is meant a surface area measured by surface adsorption techniques within the range of from about 25 to about 500 or more square meters per gram and preferably a support having a surface area of approximately 100 to 300 square meters per gram. However, as set forth hereinbefore, alpha-alumina, which is usually characterized by a surface area ranging from about 10 to about 25 square meters per gram is also satisfactory support. Therefore, satisfactory supports for the preparation of catalysts for use in the process of this invention include high surface area crystalline alumina modifications such as gamma-, eta- and theta-alumina and low surface area supports such as alpha-alumina although these are not necessarily of equivalent suitability. In addition to the aforementioned alpha-, gamma-, eta- and theta-aluminas which may be utilized as solid supports, it is also contemplated that other refractory oxides such as silica, zirconia, magnesia, thoria, etc. and combinations of refractory oxides such as silica-alumina, silica-magnesia, alumina-silica-magnesia, alumina-thoria, alumina-zirconia, etc. may also be utilized as solid supports for the catalyst of the present invention.

As set forth hereinabove, the catalyst comprises a phosphoric acid-containing composite that is combined with an oxide of sulfur to effect chemical combination of the phosphoric acid portion of said composite with said oxide of sulfur. The phosphoric acid-containing composite may be made by combining an acid of phosphorus such as ortho-, pyro- or tetra-phosphoric acid with the solid support. Orothophosphoric ($H_3PO_4$) and pyrophosphoric acid ($H_4P_2O_7$) find general application due mainly to the cheapness and to the readiness with which they may be procured although the invention is not restricted to their use, but may employ any of the other acids of phosphorus insofar as they are adaptable. However, it is not intended to infer that the different acids or phosphorus which may be employed will produce catalysts which have identical effects upon any given organic reactions as each of the catalysts produced from different acids and by slightly varying procedures will exert its own characteristic action.

Triphosphoric acids, which may be represented by the formula $H_5P_3O_{10}$, may also be used as one of the starting materials for the preparation of the composite utilized in the catalyst of this invention.

A phosphoric acid mixture which is generally referred to as polyphosphoric acid may also be employed in manufacturing the composite. Polyphosphoric acid is formed by heating orthophosphoric acid or pyrophosphoric acid or mixtures thereof in suitable equipment such as carbon lined trays heated by flue gases or other suitable means to produce a phosphoric acid mixture generally analyzing from about 79% to about 85% by weight of $P_2O_5$.

Tetraphosphoric acid, having the general formula $H_6P_4O_{13}$ which corresponds to the double oxide formula $3H_2O \cdot 2P_2O_5$ may be considered as the acid resulting when three molecules of water are lost by four molecules of orthophosphoric acid, $H_3PO_4$. The tetraphosphoric acid may be manufactured by gradual or controlled dehydration or heating of orthophosphoric acid and pyrophosphoric acid or by adding phosphorus pentoxide to these acids in proper amounts.

The phosphoric acid-containing composite utilized in the present invention may contain from about 8% or lower to about 80% by weight of phosphoric acid and preferably from about 10% to about 50% by weight of phosphoric acid. Prior art solid phosphoric acid catalytic composites usually contain from about 50 to about 75% by weight of phosphoric acid composited with the solid carrier since lower acid contents cause the solid phosphoric acid catalytic composite to suffer from a hydrocarbon conversion activity standpoint while those with too high a content of phosphoric acid have poor structural strength. Solid phosphoric acid catalytic composites have been manufactured by prior art methods with from about 15% to about 75% by weight of phosphoric acid but compression pressures ranging from about 5,000 to about 50,000 pounds per square inch during the manufacturing process have been found necessary to give the catalyst increased structural strength.

It is therefore a feature of the present invention that the phosphoric acid-containing composite utilized in the present invention may contain less than about 50% by weight of phosphoric acid without causing the hydrocarbon conversion activity of the finished catalyst to suffer and without the need for subjecting the composite to high compression pressures during manufacture in order to give the catalyst increased structural strength inasmuch as the finished catalyst of the present invention prepared as hereinafter set forth has increased structural strength and a high degree of stability due to the immobility of the components of the finished catalyst inasmuch as chemical combination of the phosphoric acid portion of the composite with the oxide of sulfur is accomplished as hereinafter described.

Oxides of sulfur which may be chemically bound to the phosphoric acid portion of the phosphoric acid-containing composite include metallic oxides of sulfur in which the metallic portion of the compound preferably comprises a metal of Group VI B of the periodic table, a metal of the Iron Group of Group VIII, as well as aluminum, etc. such as aluminum sulfate, nickel sulfate, nickel sulfite, chromium sulfate, chromium sulfite, molybdenum sulfate, tungsten sulfate, cobalt sulfate, cobaltous sulfite, ferric sulfate, ferric sulfite, etc. In addition to the hereinabgove enumerated metallic oxides of sulfur it is also contemplated within the scope of this invention that the phosphoric acid-containing composite may be impregnated with a solution of ammonium sulfate or ammonium sulfite, or, if so desired, with a solution of sulfuric or sulfurous acid adjusted to a pH of about 9.0 by the addition of a sufficient amount of ammonium hydroxide. Following the impregnation, the phosphoric acid-containing support is then heat treated thereby driving off the ammonia and allowing the oxide of sulfur to remain impregnated on and chemically bonded to the phosphoric acid portion of the phosphoric acid-containing composite. The catalyst comprises an oxide of sulfur chemically combined with the phosphoric acid portion of the composite so as to effect chemical combination of the hydroxyl groups of the phosphoric acid with the oxide of sulfur, and as hereinbefore set forth, it is the particular association of these components which results in the unusual catalytic properties of this catalyst. In addition to the aforesaid oxides of sulfur, the phosphoric acid-containing composite may also be impregnated with concentrated sulfuric or sulfurous acid in an amount sufficient that the final catalytic composite possesses from about 1 to about 25% by weight of sulfate or sulfite content.

The chemical addition of the oxide of sulfur to the phosphoric acid portion of the phosphoric acid-containing composite will enhance the surface area characteristics of the composite inasmuch as the finished catalytic composite exhibits greater surface area than the phosphoric acid-containing composite originally possessed. Further, the final catalytic composite obtained by the preparation as described hereinabove is substantially anhydrous due to the chemical combination of the oxide of sulfur with the phosphoric acid-containing portion of the composite. Thus, it is another feature of the present invention that a substantially anhydrous support initially is not necessary to prepare the catalyst of the present invention. Still another feature of the present invention is that the final catalytic composite does not need hydration during processing as does a phosphoric acid-containing composite as is taught in the prior art inasmuch as the final catalytic composite is substantially anhydrous and thus deterioration of a physical nature by processing factors tending to further dry the catalyst is not a problem in the present invention.

As hereinbefore set forth, certain forms of alumina may be utilized as supports for the catalyst of this invention. For example, alumina may be prepared by any of the well known suitable means of manufacture, one example of which is the addition of an alkaline reagent to a salt of aluminum in an amount sufficient to form aluminum hydroxide, which, upon drying and calcining, is converted to alumina. Similarly, if the solid support comprises both alumina and silica, these components may be prepared by separate, successive or coprecipitate means.

For example, a phosphoric acid-containing composite previously prepared by the methods hereinbefore set forth is then chemically combined with an oxide of sulfur such as by treating the composite with an oxide of sulfur, said oxide of sulfur being added in an amount sufficient to allow the finished catalytic composite to contain from about 1.0 to about 25% or more by weight of sulfate or sulfite. Following this, the chemically combined material is then dried by heat treatment in a furnace tube or muffle furnace, etc. The finished catalytic composite comprising the oxide or sulfur chemically combined with the phosphoric acid portion of the phosphoric acid-containing composite is then utilized as the conversion catalyst.

The process of this invention utilizing the catalyst hereinbefore set forth may be effected in any suitable manner and may comprise either a batch or a continuous type operation. The preferred method by which the process of this invention may be effected is a continuous type operation. One particular method is the fixed bed operation in which the alkylatable aromatic compound and the olefin-acting compound are continuously charged to a reaction zone containing a fixed bed of the desired catalyst, said zone being maintained at the proper operating conditions of temperature and pressure including a temperature in the range of from about 0° to about 300° C. and preferably in the range of from about 40° C. to about 180° C., and a pressure in the range of from about atmospheric to about 200 atmospheres and at a liquid hourly space velocity (the volume of charge per volume of catalyst per hour) in the range of from about 0.1 to about 20 or more, and preferably in a range of from 0.1 to about 10, or at a gaseous hourly space velocity in the range of from about 100 to about 1500 or more. The reaction zone may comprise an unpacked vessel or coil or may be lined with an adsorbent packing material. The two reactants may be charged through separate lines or, if so desired, may be admixed prior to entry into said reaction zone and charged thereto in a single stream. This charge passes through the catalyst bed in either an upward or downward flow and the alkylated product is continuously withdrawn, separated from the reactor effluent, and recovered while any unreacted starting materials may be recycled to form a portion of the feed stock. Another continuous type operation comprises the moving bed type in which the reactants and the catalyst bed move either concurrently or counter-currently to each other while passing through said reaction zone. Yet another continuous type of operation which may be used is the slurry type in which the catalyst is carried into the reaction zone as a slurry in one or the other of the reactants.

Still another type of operation which may be used is the batch type operation in which a quantity of the alkylatable aromatic compound, the olefin-acting compound and the catalyst are placed in an appropriate apparatus such as, for example, a rotating or stirred autoclave or an alkylation flask. The apparatus is then heated to the desired temperature and maintained thereat for a predetermined residence time at the end of which time the vessel and contents thereof are cooled to room temperature and the desired reaction product recovered by conventional means such as for example, by washing, drying, fractional distillation, crystalliaztion, etc.

The following examples are introduced for the purpose of illustration only with no intention of unduly limiting the generally broad scope of the present invention.

*Example I*

In this example, polyphosphoric acid is treated with ammonium hydroxide to a pH of approximately 9.0 and this solution is impregnated on the solid support, namely gamma-alumina. The impregnated support is then heated in a furnace tube to a temperature of about 500° C. and maintained at this temperature for a period of about two hours while heat treating the composite. During the heat treatment of the composite to the desired temperature, it will be noted that ammonia gas is evolved from the composite thereby leaving phosphoric acid deposited on the refractory oxide support. This phosphoric acid-containing composite containing approximately 50% by weight of phosphoric acid is then subjected to chemical reaction at a temperature in the range of from about 300° C. to about 600° C. with an oxide of sulfur, namely sulfur trioxide. The finished catalyst will contain about 8.5 weight percent of sulfate (which is approximately 2.8 weight percent sulfur). This catalyst is designated as catalyst "A."

*Example II*

Another catalyst is prepared by impregnating silica with another polyphosphoric acid-ammonium hydroxide solution. The impregnated support is then heat treated in a furnace tube to a temperature of about 500° C. and kept thereat for a period of about two hours. It is noted that ammonia gas is evolved from the composite thereby leaving phosphoric acid deposited on the refractory oxide support. This phosphoric acid-containing composite containing approximately 30% by weight of phosphoric acid is then subjected to substantially complete chemical reaction with an oxide of sulfur derived from sulfuric acid. The composite is subjected to an impregnation with 85 cc. of a solution containing 10 cc. of concentrated sulfuric acid which has been adjusted to a pH of 9.0 with ammonium hydroxide. The resultant composite is again slowly heat treated in the furnace tube to about 600° C. and once again the evolution of ammonia gas takes place leaving the oxide of sulfur chemically combined with the phosphoric acid portion of the silica support. This catalyst is designated as catalyst "B."

*Example III*

Yet another catalyst is prepared by impregnating silica with another polyphosphoric acid-ammonium hydroxide solution. The impregnated support is then heat treated in a furnace tube to a temperature of about 500° C. and kept thereat for a period of about two hours. It is noted that ammonia gas is evolved from the composite thereby leaving phosphoric acid deposited on the refractory oxide support. This phosphoric acid-containing composite containing approximately 25% by weight of phosphoric acid is then subjected to chemical reaction with an oxide of sulfur derived from aluminum sulfate. The composite is then subjected to an impregnation with a 20% aluminum sulfate solution. The resultant composite is again slowly heat treated in the furnace tube to about 600° C. and chemical combination of the oxide of sulfur and the phosphoric acid portion of the silica support occurs. This catalyst is designated as catalyst "C."

*Example IV*

In this example, a catalyst is prepared by impregnating alumina with another polyphosphoric acid-ammonium hydroxide solution. The impregnated support is then heat treated in a furnace tube to a temperature of about 500° C. and kept thereat for a period of about two hours. It is noted that ammonia gas is evolved from the composite thereby leaving phosphoric acid deposited on the refractory oxide support. This phosphoric acid-containing composite containing approximately 38% by weight of phosphoric acid is then subjected to chemical reaction with an oxide of sulfur derived from ammonium sulfate. The composite is subjected to an impregnation with a 20% ammonium sulfate solution. The resultant composite is again slowly heat treated in the furnace tube to about 600° C. and once again the evolution of ammonia gas takes place leaving the oxide of sulfur chemically combined with the phosphoric acid portion of the alumina support. This catalyst is designated as catalyst "D."

*Example V*

The catalyst prepared according to Example I above and designated as catalyst "A" is utilized in an alkylation reaction to determine the alkylation activity of said catalyst. In this experiment, 100 grams of the catalyst prepared according to the method of Example I is placed in an appropriate apparatus which is provided with heating means. In the experiment, benzene and ethylene are charged separately to the alkylation reaction zone. The reactor is maintained at about 500 p.s.i.g. and 110° C. Substantially complete conversion of the ethylene is obtained. The product is analyzed for olefins using a mass spectrometer and it is found that the product comprises ethylbenzene, diethylbenzene, polyethylbenzenes and unreacted benzene.

*Example VI*

The catalyst prepared according to Example II and designated as catalyst "B" is utilized in the alkylation reaction zone, 100 grams of the finished catalyst being placed in the alkylation apparatus. In the experiment, benzene and ethylene are charged separately to the alkylation zone which is maintained at about 500 p.s.i.g. and 100° C. Based on weight, substantially complete conversion of the ethylene is obtained. The product is analyzed for olefins using a mass spectrometer and it is found that the product comprises ethylbenzene, diethylbenzene, polyethylbenzenes and unreacted benzene.

*Example VII*

The catalyst prepared according to Example III and designated as catalyst "C" is utilized in an alkylation reaction, 100 grams of the finished catalyst being placed in the alkylation apparatus. In the experiment, benzene and propylene are charged separately to the alkylation zone. The reaction is maintained at about 500 p.s.i.g. and 100° C. Substantially complete conversion of the propylene is obtained. The product is analyzed for olefins using a mass spectrometer and it is found that the product comprises cumene, diisopropylbenzene, polypropylbenzenes and unreacted benzene.

*Example VIII*

The catalyst prepared according to Example IV above and designated as catalyst "D" is utilized in the alkylation of benzene with a synthetic refinery off-gas similar to that normally observed from a catalytic cracking unit. A 100 gram batch of the catalyst is placed in an alkylation reactor and the reactor is maintained at a temperature in the range of from about 100° C. to about 180° C. at a pressure at about 600 p.s.i.g. The composition of the synthetic off-gas feed is as follows: carbon dioxide, 0.1 mol percent; nitrogen, 29.0 percent; carbon monoxide, 1.3 mol percent; hydrogen, 18.9 mol percent; methane, 35.0 mol percent; ethylene, 12.0 mol percent; ethane, 0.5 mol percent; propylene, 2.5 mol percent; propane, 0.1 mol percent; isobutane, 0.1 mol percent; and acetylene, 0.5 mol percent. The off-gas and benzene are charged separately to the alkylation zone. The plant liquid effluent is tested for unsaturation and is found to have a low bromine index indicating the substantial absence of olefin polymerization products. The product comprises ethylbenzene, diethylbenzene, polyethylbenzenes, cumene, diisopropylbenzene, polypropylbenzenes and 1,1-diphenylethane.

I claim as my invention:

1. A process for the alklation of an alkylatable aromatic hydrocarbon with an olefin-acting compound at alkylation conditions in the presence of a substantially anhydrous catalyst comprising a phosphoric acid-containing composite in which the phosphoric acid portion is chemically combined with an oxide of sulfur.

2. A process for the alkylation of an alkylatable aromatic hydrocarbon with an olefin-acting compound at alkylation conditions in the presence of a substantially anhydrous catalyst comprising a phosphoric acid-containing composite in which the phosphoric acid portion is chemically combined with an oxide of sulfur selected from the group consisting of sulfuric acid, sulfurous acid, ammonium oxides of sulfur and metallic oxides of sulfur.

3. A process for the alkylation of an alkylatable aromatic hydrocarbon with an olefin-acting compound at alkylation conditions including a temperature in the range of from about 0° to about 300° C. and a pressure in the range of from about atmospheric to about 200 atmospheres in the presence of a substantially anhydrous catalyst comprising a phosphoric acid-containing composite in which the phosphoric acid portion is chemically combined with an oxide of sulfur selected from the group consisting of sulfuric acid, sulfurous acid, ammonium oxides of sulfur and metallic oxides of sulfur.

4. A process for the alkylation of an alkylatable aromatic hydrocarbon with an olefin-acting compound at alkylation conditions including a temperature in the range of from about 0° to about 300° C. and a pressure in the range of from about atmospheric to about 200 atmospheres in the presence of a substantially anhydrous catalyst comprising a phosphoric acid-containing composite in which the phosphoric acid portion is chemically combined with an oxide of sulfur derived from sulfuric acid.

5. A process for the alkylation of an alkylatable aromatic hydrocarbon with an olefin-acting compound at alkylation conditions including a temperature in the range of from about 0° to about 300° C. and a pressure in the range of from about atmospheric to about 200 atmospheres in the presence of a substantially anhydrous catalyst prepared by combining a phosphoric acid-containing composite with an oxide of sulfur derived from ammonium sulfate to effect chemical combination of the phosphoric acid portion of said composite with said oxide of sulfur.

6. A process for the alkylation of an alkylatable aromatic hydrocarbon with an olefin-acting compound at alkylation conditions including a temperature in the range of from about 0° to about 300° C. and a pressure in the range of from about atmospheric to about 200 atmospheres in the presence of a substantially anhydrous catalyst prepared by combining a phosphoric acid-containing composite with an oxide of sulfur derived from aluminum sulfate to effect chemical combination of the phosphoric acid portion of said composite with said oxide of sulfur.

7. The process of claim 1 further characterized in that said phosphoric acid portion and oxide of sulfur are reacted at a temperature of from about 300° C. to about 600° C.

8. The process of claim 3 further characterized in that said phosphoric acid portion and oxide of sulfur are reacted at a temperature of from about 300° C. to about 600° C.

9. The process of claim 3 further characterized in that said alkylatable aromatic hydrocarbon is a benzene hydrocarbon.

10. The process of claim 3 further characterized in that said olefin-acting compound is an olefinic hydrocarbon.

11. The process of claim 3 further characterized in that said olefin-acting compound is a normally gaseous olefin.

12. A process for the alkylation of benzene with ethylene at alkylation conditions including a temperature in the range of from about 0° to about 300° C. and a pressure in the range of from about atmospheric to about 200 atmospheres in the presence of a substantially anhydrous catalyst comprising a phosphoric acid-containing composite in which the phosphoric acid portion is chemically combined with an oxide of sulfur selected from the group consisting of sulfuric acid, sulfurous acid, ammonium oxides of sulfur and metallic oxides of sulfur.

13. A process for the alkylation of benzene with propylene at alkylation conditions including a temperature in the range of from about 0° to about 300° C. and a pressure in the range of from about atmospheric to about 200 atmospheres in the presence of a substantially anhydrous catalyst prepared by combining a phosphoric acid-containing composite with an oxide of sulfur derived from aluminum sulfate to effect chemical combination of the phosphoric acid portion of said composite with said oxide of sulfur.

14. A process for the alklation of benzene with butylene at alkylation conditions including a temperature in the range of from about 0° to about 300° C. and a pressure in the range of from about atmospheric to about 200 atmospheres in the presence of a substantially anhydrous catalyst prepared by combining a phosphoric acid-containing composite with an oxide of sulfur derived from ammonium sulfate to effect chemical combination of the phosphoric acid portion of said composite with said oxide of sulfur.

15. A process for the alkylation of benzene with a refinery off-gas at alkylation conditions including a temperature in the range of from about 0° to about 300° C. and a pressure in the range of from about atmospheric to about 200 atmospheres in the presence of a substantially anhydrous catalyst prepared by combining a phosphoric acid-containing composite with an oxide of sulfur derived from ammonium sulfate to effect chemical combination of the phosphoric acid portion of said composite with said oxide of sulfur.

16. A process for the alkylation of benzene with ethylene at alkylation conditions including a temperature in the range of from about 0° to about 300° C. and a pressure in the range of from about atmospheric to about 200 atmospheres in the presence of a substantially anhydrous catalyst comprising a phosphoric acid-containing composite in which the phosphoric acid portion is chemically combined with an oxide of sulfur derived from sulfuric acid.

References Cited by the Examiner

UNITED STATES PATENTS 2,843,640   7/1958   Langlois et al. _____ 252—437 X

DELBERT E. GANTZ, *Primary Examiner.*

C. R. DAVIS, *Assistant Examiner.*